United States Patent [19]

Kuhn et al.

[11] 3,891,607

[45] June 24, 1975

[54] PROCESS FOR THE PRODUCTION OF THERMOREVERSIBLE COACERVATES

[75] Inventors: Rainer Kuhn, Bergisch, Gladbach; Nikolaus Schon, Leverkusen, both of Germany

[73] Assignee: Bayer Aktiengesellschaft, Germany

[22] Filed: Aug. 21, 1973

[21] Appl. No.: 390,203

[30] Foreign Application Priority Data
Dec. 9, 1970  Germany............................ 2060571

[52] U.S. Cl. ...................... 260/80.3 N; 260/29.6 H
[51] Int. Cl. ............................................ C08f 15/02
[58] Field of Search ....... 260/80 M, 80.3 N, 89.7 R, 260/29.6 H

[56] References Cited
UNITED STATES PATENTS

| | | | |
|---|---|---|---|
| 2,476,527 | 7/1949 | Barnes | 260/8 |
| 2,506,537 | 5/1950 | Barnes | 260/29.6 |
| 3,332,922 | 7/1967 | Hoover | 260/89.7 |
| 3,658,772 | 4/1972 | Volk | 260/80.3 N |

*Primary Examiner*—Christopher A. Henderson
*Attorney, Agent, or Firm*—Connolly and Hutz

[57] ABSTRACT

A thermoreversible coacervate obtained by copolymerising acrylic acid and acrylamide in aqueous solution and by adjusting the pH-value of said solution to below 3.3 and the temperature to below the coacervate transition temperature.

4 Claims, No Drawings

PROCESS FOR THE PRODUCTION OF THERMOREVERSIBLE COACERVATES

CROSS-REFERENCE TO RELATED APPLICATION

This application is a continuation of application Ser. No. 205,713 filed Dec. 7, 1971 and now abandoned.

It is known that polymers can form weak intermolecular bonds in dependence upon temperature. The effect of these bonds, generally produced by ionic groups, is for example that aqueous solutions of gelatin form gels below temperatures of from about 30°C to 40°C, due to additional bonds, becoming thinly liquid above this gel temperature. Synthetic polymers have also been described which show a thermoreversible gelation similar to that of gelatin. U.S. Pat. Nos. 2,461,023; 2,476,527 and 2,506,537 relate to copolymers of methacrylamide and methacylic acid which are produced with benzoyl peroxide and which are said to give solutions showing reversible gelation at certain pH-values.

Coacervation, i.e., the formation of polymer-rich aqueous phases, accompanied by phase separation, is another phenomenon which is attributable to weak inter-molecular bonds. Phase separation is obtained for example by adding a salt or alcohol to a concentrated solution of gelatin whose pH-value is as close as possible to the isoelectric point. The coacervate, i.e., the polymer-rich phase, still contains about 25 to 50 percent of the quantity of water originally present. In complex coacervation (cf. Bungenberg de Jong Kolloid Z. 58 (1962) page 209) a dilute gelatin solution (pH-value ≤ isoelectric point) is mixed with a solution of gum arabic, the opposite charges leading to a weak ionic crosslinking and hence to formation of a coacervate. These coacervates are thermoreversible, redissolving again above a certain temperature.

A new process for the production of thermoreversible coacervates of synthetic polymers has now been found wherein a mixture of acrylamide and acrylic acid is copolymerised in aqueous solution on a radical forming catalyst, and the pH-value of the resulting polymer solution is adjusted to a value below 3.3, before or after polymerisation, by the addition of a strong acid.

The polymerisation is preferably carried out in the absence of oxygen in an inert-gas atmosphere, for example in nitrogen or argon. The aqueous monomer solution used is preferably freed from oxygen.

The aqueous monomer solution used contains acrylamide and acrylic acid in molar ratios of from about 30:70 to 70:30. It is preferred to use a monomer solution containing acrylamide and acrylic acid in a molar ratio of 1:1. The total concentration of monomers in the solution can be from 3 to 30 percent by weight, based on water, although it is preferred to work at a concentration of from 5 to 15 percent by weight.

The usual radical formers can be used as polymerisation catalysts. The following are mentioned by way of examples: peroxidic compounds, such as alkyl, aryl and acyl peroxides and hydroperoxides (for example cumene hydroperoxide, benzoyl peroxide, t-butyl hydroperoxide and cyclohexyl percarbonate hydrogen peroxide, optionally in combination with a reducing agent, for example a ferrous salt, amine, sulphinic acid or sulphite and azo compounds, for example bis-azoisobutyronitrile, optionally in combination with a reducing agent.

These catalysts are normally used in a quantity of from 0.05 to 5 parts per 100 parts of total monomer, although polymerisation is preferably carried out with 0.3 to 1.5 parts of catalyst per 100 parts of monomer.

The polymerisation can be carried out a temperature of from 10° to 100°C, the usual range being from 20° to 90°C. At temperatures in this range, the polymerisation reaction is generally finished after 1 to 3 hours.

The acids used in the process according to the invention must have an acid strength which is sufficient to reduce below 3.3 pH-value of the monomer solutions or polymer solutions used. Sulphuric acid and hydrochloric acid are preferably used. Other suitable acids include, for example, the other hydrohalic acids, phosphoric acid, halogen carboxylic acids, and nitric acid etc. The thermoreversible coacervates according to the invention are formed when the polymer solution, whose pH-value must be below 3.3 is cooled to below the coacervate transition temperature. Coacervation can even begin during polymerisation if the polymerisation temperature is below the coacervate transition temperature and if the pH-value is below 3.3.

The acid used in accordance with the invention is added before polymerisation, i.e., to the monomer solution or to the polymer solution, its temperature preferably being above the coacervate transition temperature. The acid can also be added during polymerisation.

Formation of the thermoreversible coacervates in recognisable from the fact that, as the temperature of a polymer solution having a pH-value of below 3.3 falls, hazing initially occurs, being followed by the formation of a second phase. The polymer-rich phase, i.e., the coacervate, is separated off as the lower phase.

The transition temperature is governed by the pH-value of the polymer solution, and by the molecular weight of the copolymers. The transition temperature rises with falling pH-values, in other words, for example, a solution of a copolymer of acrylic acid/acrylamide having a pH-value of 3.0 shows coacervate formation at 30°C, whilst coacervate formation actually begins at 40°C. in the event of acidification to pH 1.5.

A relatively high molecular weight of the copolymers also produces an increase in the transition temperature.

The transition temperatures can be in the range from 10° to 45°C.

Above their transition temperatures, the coacervates redissolve to form homogeneous polymer solutions. The coacervate/polymer solution transition is reversible, in other words it can be repeated as often as required, in either direction, through suitable changes in temperature. The coacervates have a water content of from 65 to 90 percent by weight and are free-flowing to viscous masses whose consistency is also governed to a large extent by the molecular weight of the polymers, insofar as the water content of the coacervates increases with increasing molecular weight. The water content of the coacervates falls with decreasing pH-value.

It was extremely surprising that synthetic thermoreversible coacervates should be formed under the conditions according to the invention. If, for example, a solution of a 50/50 acrylic acid/acrylamide copolymer with a pH-value of 4 is cooled to 5°C. no phase separation or coacervate formation occurs. It is only at pH 3–3.3 that substantially quantitative separation of the copolymer into the lower phase (coacervate) occurs. The composition of the copolymers is also highly decisive, i.e., copolymers with an excessive acrylamide or acrylic acid content (in excess of 70 percent by weight) only show incomplete coacervate formation, or no coacervate formation at all, or the transition temperatures are very low.

Comparative tests with equivalent monomer mixtures of acrylamide/methacrylic acid, methylamide/acrylic acid or methacrylamide/methacrylic acid, actually resulted in a precipitation of polymer during the polymerisation reaction. The copolymers formed do not dissolve following an increase in temperature to 100°C, in other words they are not thermoreversible coacervates.

The synthetic coacervates according to the invention can be used in the same way as gelatin/gum arabic coacervates for the production of coatings, microcapsules and microgranulates. They have the advantage of reproducible production, in contrast to the variations in quality of natural products. The carboxyl groups and the amide groups facilitate derivative reactions, for example crosslinking reactions, so that the properties of the coatings, coverings or microcapsules can be specifically influenced. The yields of coacervate in the process according to the invention are extremely favourable, in other words the copolymer is transferred almost entirely into the coacervate and the supernatant water phase is substantially free from polymers.

Particularly interesting applications are made possible by preparing coacervating solutions above their transition temperature and dipping cooled objects into the resulting solutions. The coacervate is deposited onto the surface of the objects, so that coatings can be produced in this way. The invention is illustrated by the following examples in which parts and percentages are by weight unless otherwise indicated.

EXAMPLE 1

A monomer solution was prepared from 920 parts of water, 40 parts of acrylic acid, and 40 parts of acrylamide, in the absence of oxygen, i.e., in a nitrogen atmosphere. The monomer solution was heated to 90°C followed by the addition of 0.5 parts of lauryl peroxide. Polymerisation began immediately, and after 3.5 hours, a conversion of 99.5 percent was achieved. The polymer solution had a pH-value of 3.5. Part of the solution was cooled to 10°C. It was not possible to detect any phase separation. The remainder of the polymer solution was acidified with $2n$ hydrochloric acid to pH 3.0 at 50°C, and then cooled. The solution began to haze at 30°C and a second phase was gradually formed. The temperature was reduced to 20°C. After 1 hour, 97 percent of the copolymer was in the lower phase (coacervate), the water content of the coacervate amounted to 82 percent. The two phases, coacervate and supernatant water, were heated again. At 30°C, the coacervate was completely redissolved in the supernatant water, and the system became single-phase again. Viscosity determination of the copolymer: The viscosity $1n\eta r/c$ was 7.5.

$\eta r$ = relative viscosity, $c$ = concentration in g/100 ml. of water.

The viscosity was measured on a 0.05 percent aqueous solution (based on polymer) at 25°C following the addition of 1 percent of NaCl under a shear strain $\tau = 0.99$ dyne/cm$^2$ and at a pH-value of 7, NaOH being used for neutralisation.

EXAMPLE 2

A monomer solution was prepared under the same conditions as in Example 1, 0.4 part of cumene hydroperoxide and 0.1 part of sodium formaldehyde sulphoxylate being added to it at 70°C. Polymerisation, which began immediately, had reached a conversion of 98.8 percent after 3 hours. The polymer solution had a pH-value of 3.4. A sample cooled to 10°C did not show any sign of phase separation. The pH-value of the solution was lowered to 2.5 with dilute sulphuric acid. Coacervate formation actually began on cooling to 33°C. At 20°C, 96 percent of the copolymer was in the coacervate. Measurement of the viscosity of the copolymer, carried out as in Example 1, produced a $\eta r$-value of 10.2. The coacervate was thermoreversible.

EXAMPLE 3

Polymerisation was carried out in the same way as in Example 2, except that 10 percent sulphuric acid was added to the monomer solution until it had a pH-value of 2.4. When the resulting polymer solution was cooled, coacervate formation occurred at 34°C. $1n\eta r/c = 10.8$.

The coacervate was thermoreversible.

EXAMPLE 4

A monomer solution was prepared under nitrogen from 900 parts of water, 25 parts of acrylic acid and 55 parts of acrylamide. 0.75 parts of t-butyl hydroperoxide and parts of sodium formaldehyde sulphoxylate was added at 60°C. A conversion of 98.5 percent had been reached after 2½ hours. The solution of the copolymer had a pH-value of 3.7 and did not show any coacervate formation on cooling. The pH-value was lowered to 2.7 by the addition of $2n$ hydrochloric acid. At 30°C, the solution separated into two phases, 95 percent of the copolymer being converted into the coacervate. The viscosity $1n\eta r/c$ amounted to 12.5. At 30° to 32°C the coacervate was redissolved in the supernatant phase.

EXAMPLE 5

A monomer solution was prepared under a nitrogen atmosphere from 20 parts of acrylic acid, 60 parts of acrylamide and 880 parts of water, and was heated to 90°C. 0.5 parts of bis-azoisobutyronitrile were added at that temperature as a result of which polymerisation began. After 3 hours at 90°C, the polymer yield amounted to 98.9 percent. The solution had a pH-value of 3.7. A sample was cooled to 5°C and did not show any sign of coacervate formation. After the polymer solution had been acidified with $2n$ H$_2$SO$_4$ to pH 2.8, coacervate formation began on cooling to 33°C. 96 percent of the copolymer were present in the coacervate whose water content was 84 percent. The coacervate redissolved at 33°–35°C.

EXAMPLE 6

0.6 parts of bis-azoisobutyronitrile were added at 90°C to a monomer solution of 900 parts of water, 40 parts of acrylamide and 40 parts of acrylic acid. Polymerisation was carried out at this temperature and was over after 2 hours (conversion 98.8 percent). The pH-value of the solution was 3.5 A sample cooled to 10°C did not show any sign of coacervate formation.

Various samples of the polymer solution were acidified with 10 percent hydrochloric acid at 50°C and then cooled. The following coacervate transition temperatures were recorded in dependence upon the pH-value:

| pH-value of sample | Coacervate formation t °C | Water content of the coacervates |
| --- | --- | --- |
| 2.44 | 30 | 85 |
| 2.0 | 35 | 83 |
| 1.4 | 40 | 81 |
| 1.0 | 45 | 79 |

All the coacervates were thermoreversible, i.e., they redissolved when heated beyond the transition temperature. The molecular weight of the copolymer, expressed by $\ln \eta r/c$ amounted to 11.5.

EXAMPLE 7 (Comparison)

43 parts of methacrylic acid and 35 parts of acrylamide were dissolved in 900 parts of water in the absence of oxygen in a nitrogen atmosphere. 0.6 parts of bisazoisobutyronitrile were added as catalyst at 90°C. The viscosity of the solution rose quickly, the temperature being kept at 90°C. After 2 hours, a conversion of 97 percent had been achieved. The polymer had precipitated in flake form in the reaction medium. The reaction mixture was heated to 99°C, but the copolymer did not dissolve. By neutralisation with $NH_3$, the copolymer was gradually dissolved. At pH 7, the solution was clear but did not show any sign of phase separation on cooling to 0°C. The concentration, based on the polymer used, amounted to 6.8 percent. Following acidification to pH 2.5, the copolymer was precipitated again and did not redissolve on heating.

EXAMPLE 8 (Comparison)

36 parts of acrylic acid and 42 parts of methacrylamide were copolymerised under the same conditions as in Example 7. After 2.5 hours, a conversion of 98 percent had been achieved. The copolymer had precipitated from the monomer solution in the form of white flakes which settled. It was not possible to dissolve the copolymer by heating to 98°C. It was only after neutralisation to pH 7 with $NH_3$ that the copolymer dissolved. There was no sign of phase separation, however, on cooling to 0°C.

EXAMPLE 9 (Comparison)

42 parts of methacrylamide, 43 parts of methacrylic acid and 850 parts of water were mixed. 0.6 parts of t-butyl hydroperoxide and 0.06 part of sodium formaldehyde sulphoxylate were added at 60°C. The copolymer formed was precipitated as the lower phase in the form of viscous, water-containing polymer lumps. The copolymer did not dissolve, even when the reaction mixture was heated to 95°C; the system remained at two-phase system. Only after neutralisation with $NH_3$ to pH 7 did solution occur. There were, however, no signs of phase separation on cooling.

We claim:

1. A process for the production of a thermoreversible coacervate which comprises copolymerizing from 30 to 50 mol percent of acrylic acid and from 70 to 30 mol percent of acrylamide in aqueous solution in the presence of a free-radical catalyst and in the absence of a water-soluble inorganic salt at a temperature between the coacervate transition temperature and 100°C., lowering the pH-value of the solution either prior to, during or after polymerization to below 3.3 and adjusting the temperature of the solution to below the coacervate transition temperature.

2. The process of claim 1 wherein the molar ratio of acrylic acid to acrylamide is about 1:1.

3. The process of claim 1 wherein the total concentration of acrylic acid and acrylamide in said aqueous solution is from 3 to 30 percent by weight, based on the weight of the water.

4. The process of claim 1 wherein the total concentration of acrylic acid and acrylamide in said aqueous solution is from 5 to 15 percent by weight, based on the weight of the water.

* * * * *